UNITED STATES PATENT OFFICE.

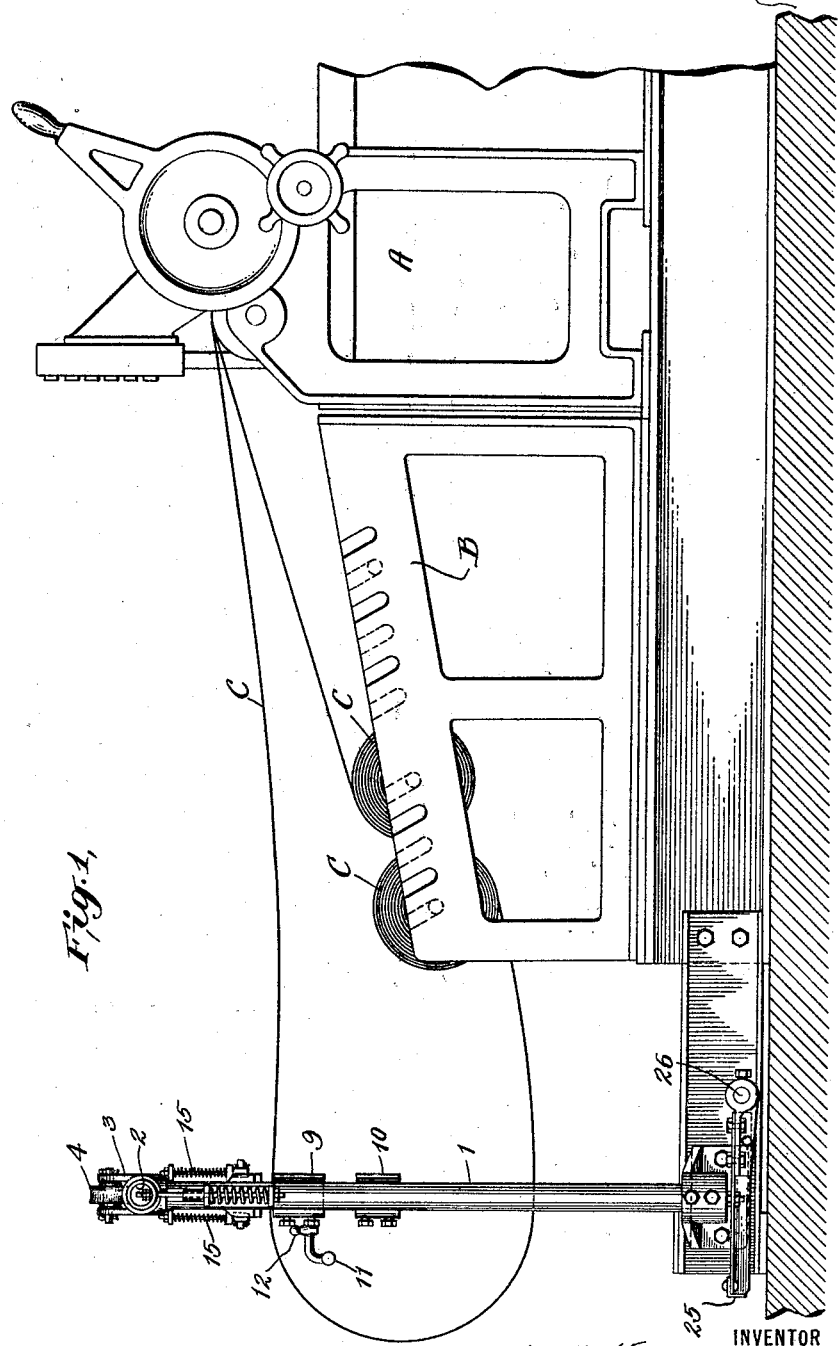

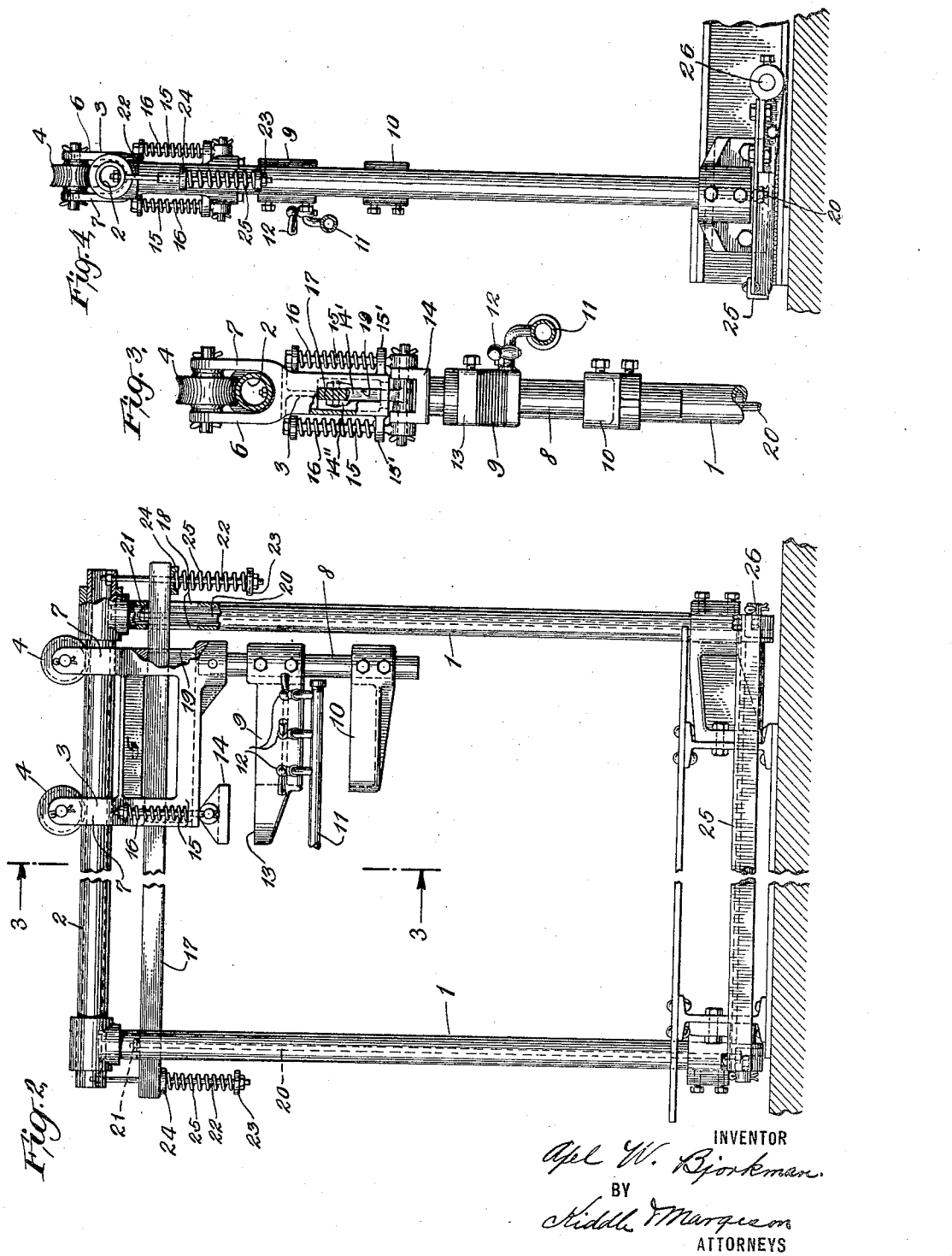

AXEL W. BJORKMAN, OF BROOKLYN, NEW YORK.

SOLDERING DEVICE.

1,422,917. Specification of Letters Patent. Patented July 18, 1922.

Application filed September 21, 1920. Serial No. 411,702.

*To all whom it may concern:*

Be it known that I, AXEL W. BJORKMAN, a citizen of the United States, and a resident of the borough of Brooklyn, in the city of New York, county of Kings, and State of New York, have invented certain new and useful Improvements in Soldering Devices, of which the following is a specification.

My invention relates to improvements in soldering devices and is more specifically directed to a device for soldering metal strips in connection with machines wherein a series of metal strips are fed through the machine and it is desired to splice one end of one strip to the end of the succeeding strip. As an example, my improved device is adapted for use in connection with machines for cleaning strip metal wherein the metal is fed through the strip cleaning machine from a roll and wherein it is desired to wind the clean strips into rolls containing several of the strips operated upon. In such a machine it is desirable to provide some means for splicing the end of a strip passed through the machine to the end of the next strip to go through the machine. Inasmuch as these machines are usually complicated and comprise a number of moving parts it becomes desirable to provide some means for splicing the strips whereby a smooth splice will be obtained and whereby there will be no danger of the strips separating after being so spliced.

To this end, therefore, I provide a splicing device which is capable of being placed at the end of a strip cleaning machine or any other type of machine with which it may be desired to use the device and by which strips may be spliced together almost instantaneously and without necessitating the use of skilled labor at all.

I have provided also a device of the character described wherein, should it be employed with a machine for treating a number of strips simultaneously, the soldering element may be adjusted relatively to the strips so as to accommodate them all.

In the accompanying drawings wherein I have illustrated an embodiment of my device,—

Fig. 1 shows my device applied to a strip cleaning machine, the device itself being shown in side elevation;

Fig. 2 shows my device in front elevation.

Fig. 3 is a section taken on the line 3—3 of Fig. 2; and

Fig. 4 is a side elevation of the apparatus of Fig. 2.

Referring to the drawings in detail, 1 designates side pieces for a frame forming part of my improved device, these side pieces or members being composed of pipes extending vertically and carrying secured to their upper ends horizontally extending pipe 2 which will be hereinafter referred to as a top member. The side members 1 and the top member 2 are hollow, as just pointed out, from choice and not from necessity. The top member 2 carries a carriage 3 supported thereon by rollers 4, the carriage 3 comprising a frame 5 provided as shown in Fig. 2 and Fig. 3 with a pair of arms 6 and a pair arms 7 extending upwardly beyond the sides of the top member 2, these arms carrying the rollers 4, already mentioned. The carriage 3 has secured to it in any suitable manner a vertically extending rod 8 to which are secured a solder container 9 and a flux container 10. The solder in the container 9 may be heated by gas supplied thereto by a supply pipe 11, the burners connected to this pipe being controlled by the cocks 12 in the usual manner. One end of the solder container constitutes one portion 13 of a press for pressing the ends of the strips together after the same have been dipped in the flux in the container 10 and the solder in the container 9. The other member of the press designated 14, is provided with vertically extending rods 15 extending through ears 15′ secured to the carriage 3, these rods carrying coil springs 16 by which the press member 14 is normally maintained in raised position. A horizontally extending beam 17 passes through slots 18 in the side members 1 of the frame of the device and also passes through the carriage 3, having movement therein or relatively thereto in slots 19 provided in the carriage for that purpose. The beam 17 is secured to the press member 14 by means of an extension 14′ constituting a part of the press member 14, this extension being forked as indicated at 14″ and extending into the member 3, the forks 14″ straddling the beam 17 and being secured thereto in any suitable manner so that when the beam is moved vertically relatively to the side members 1, the press member 14 will be reciprocated into and out of operative relation with respect to the press member 13 carried by the solder container 9.

The movement of the beam 17 is effected by rods 20 passing upwardly through the side members 1 and operatively connected to the beam by nuts 21. In order that the beam may be maintained in its uppermost position normally I have provided rods 22 secured to the top member 2, these rods being provided with a washer and nut 23 at the lower end and a washer 24 directly beneath the beam, each rod being provided also with a coil spring 25 bearing on the washer 23 and the washer 24. The lower ends of the rods 20 are secured to a foot pedal 25 pivoted at 26. It will be seen that by depressing the pedal 25 the rods 20 will be moved downwardly carrying with them the beam 17, which in turn will force the press member 14 downwardly into operative relation with respect to the press member 13, the parts being returned to their normal position by the springs 16 and 25 when the pressure on the pedal 25 is relieved.

The device is here shown applied to a strip cleaning machine and inasmuch as the latter forms no part of the present invention I have merely illustrated one end of the same more or less diagrammatically.

This machine is designated A and comprises a support B for coils of metal C, two coils having been shown in the present instance. Assuming that the machine A is in operation and that a strip of metal C has passed through the machine and it is desired to splice the end of the same to the next coil of metal, the two ends are merely overlapped by hand the required distance, then dipped into the flux in the flux container 10 and from there into the solder in the container 9, being then placed upon the press member 13 with the ends still overlapping. The pedal 25 is then depressed to bring the press member 14 down upon the overlapping ends of the metal strips and held there until the solder has cooled. This completes the splicing operation. Of course it takes but a moment for the solder to cool so that the entire operation takes but an instant of time to perform. The members 14 and 13 while they have herein been referred to as press members, are merely employed for the purpose of maintaining the overlapping ends of the metal strips in position until the solder is cooled and therefore do not function as a press as this term is ordinarily employed. It will be seen that this terminology has been employed for convenience only.

Should it be desired to employ my improved device with a strip cleaning, or other machine, wherein several strips are treated simultaneously, that is to say, passed through the strip cleaning machine A simultaneously, it will be apparent that in order to splice the next pair of strips together it will be merely necessary to move the carriage 3 along the top member 2 into position to receive the strips to be spliced.

It is to be understood that I am not to be limited to the exact details of construction here illustrated and described as obviously changes may be made therein within the purview of this invention.

What is claimed is:

1. In a soldering device, a flux container, a solder container, and a press for pressing the articles being soldered, a portion of said press being carried by the solder container.

2. In a soldering device, a flux container a solder container, and a press for pressing the articles being soldered, the said containers and press being bodily movable as a unit.

3. In a soldering device, a frame, a carriage sustained thereby, a flux container, a solder container and a press, all carried by said carriage.

4. In a soldering device, a frame, a carriage movable relatively to said frame, a press, a solder container and a flux container carried by said carriage, and a foot operated beam passing through said carriage for operating said press.

5. In a soldering device, a frame comprising vertically extending side members and a horizontally disposed top member spanning the side members and secured thereto, a carriage movable along the top member and supported thereby, and a press, a solder container and a flux container carried by said carriage and movable therewith.

6. In a soldering device, a frame comprising side members, a carriage supported by said frame and carrying a press, a solder container and a flux container, and a beam passing through said side members for operating said press.

7. In a soldering device, a frame comprising side members, a carriage supported by said frame and movable relatively thereto, a press carried by said carriage, a beam passing through said side members and through said carriage for actuating said press, and rods connected to said beam and extending through said side members for operating said beam.

8. In a soldering device, the combination of a frame comprising hollow side members, a horizontally extending top member, a carriage suspended from said top member and movable relatively to said frame, a beam passing through said side members and said carriage, a press carried by said carriage, and operable by said beam, rods within said side members and connected to said beam, and a foot pedal connected to said rods.

This specification signed this 17 day of September, 1920.

AXEL W. BJORKMAN.